United States Patent
Chou

(10) Patent No.: US 11,122,457 B2
(45) Date of Patent: Sep. 14, 2021

(54) MANAGEMENT APPARATUS AND METHOD TO SUPPORT WLAN OFFLOADING

(71) Applicant: APPLE INC., Cupertino, CA (US)

(72) Inventor: Joey Chou, Scottsdale, AZ (US)

(73) Assignee: APPLE INC., Cupertino, CA (US)

( * ) Notice: Subject to any disclaimer, the term of this patent is extended or adjusted under 35 U.S.C. 154(b) by 622 days.

(21) Appl. No.: 15/298,549

(22) Filed: Oct. 20, 2016

(65) Prior Publication Data

US 2017/0041827 A1 Feb. 9, 2017

Related U.S. Application Data

(63) Continuation of application No. 13/830,381, filed on Mar. 14, 2013, now Pat. No. 9,516,558.

(Continued)

(51) Int. Cl.
  *H04L 12/26* (2006.01)
  *H04W 28/02* (2009.01)
  (Continued)

(52) U.S. Cl.
  CPC ...... *H04W 28/0221* (2013.01); *H04B 17/318* (2015.01); *H04J 3/1694* (2013.01);
  (Continued)

(58) Field of Classification Search
  CPC ....... H04L 47/125; H04L 47/12; H04L 47/24; H04L 45/38; H04W 28/0289
  (Continued)

(56) References Cited

U.S. PATENT DOCUMENTS

2004/0097230 A1* 5/2004 Natarajan ............. H04W 36/30
                                                          455/436
2004/0170122 A1* 9/2004 Guo ...................... H04W 36/30
                                                          370/210
(Continued)

FOREIGN PATENT DOCUMENTS

CN          101491053 A       7/2009
EP          2688363 A2        1/2014
(Continued)

OTHER PUBLICATIONS

Seidel et al., "LTE Home Node Bs and its enhancements in Release 9," Nomor Research (novel mobile radio) GmbH, May 2010, 5 pages, Munich, Germany.

(Continued)

*Primary Examiner* — Atique Ahmed
(74) *Attorney, Agent, or Firm* — Stoel Rives LLP

(57) ABSTRACT

Embodiments of systems and techniques are described for supporting WLAN offloading. In some embodiments, a network management system (NMS) for WLAN offloading may include a network manager (NM); a first element manager (EM), coupled to the network manager, to communicate with the network manager and one or more WLANs; and a second EM, coupled to the NM, to communicate with the NM and one or more base stations of a cellular network. Coverage areas of at least one access point (AP) of the one or more WLANs are overlaid with at least one cell of the cellular network to support a WLAN offloading operation. Further, the NM is to activate the WLAN offloading operation based at least in part on at least one indicator received from the one or more WLANs. Other embodiments may be described and claimed.

29 Claims, 7 Drawing Sheets

Related U.S. Application Data

(60) Provisional application No. 61/707,784, filed on Sep. 28, 2012.

(51) Int. Cl.

| | | |
|---|---|---|
| *H04W 4/70* | (2018.01) | |
| *H04W 76/30* | (2018.01) | |
| *H04W 76/28* | (2018.01) | |
| *H04W 36/00* | (2009.01) | |
| *H04W 72/04* | (2009.01) | |
| *H04W 40/00* | (2009.01) | |
| *H04W 40/24* | (2009.01) | |
| *H04W 52/02* | (2009.01) | |
| *H04W 52/04* | (2009.01) | |
| *H04B 17/318* | (2015.01) | |
| *H04W 76/12* | (2018.01) | |
| *H04W 76/15* | (2018.01) | |
| *H04W 76/23* | (2018.01) | |
| *H04W 76/27* | (2018.01) | |
| *H04J 3/16* | (2006.01) | |
| *H04J 11/00* | (2006.01) | |
| *H04L 1/18* | (2006.01) | |
| *H04L 5/00* | (2006.01) | |
| *H04L 5/14* | (2006.01) | |
| *H04L 12/24* | (2006.01) | |
| *H04L 29/06* | (2006.01) | |
| *H04L 29/08* | (2006.01) | |
| *H04W 8/08* | (2009.01) | |
| *H04W 24/02* | (2009.01) | |
| *H04W 24/08* | (2009.01) | |
| *H04W 24/10* | (2009.01) | |
| *H04W 28/08* | (2009.01) | |
| *H04W 28/16* | (2009.01) | |
| *H04W 36/22* | (2009.01) | |
| *H04W 48/16* | (2009.01) | |
| *H04W 48/20* | (2009.01) | |
| *H04W 52/14* | (2009.01) | |
| *H04W 72/02* | (2009.01) | |
| *H04W 72/08* | (2009.01) | |
| *H04W 72/12* | (2009.01) | |
| *H04W 74/00* | (2009.01) | |
| *H04W 88/02* | (2009.01) | |
| *H04W 76/16* | (2018.01) | |
| *H04W 36/14* | (2009.01) | |
| *H04W 88/06* | (2009.01) | |
| *H04W 72/00* | (2009.01) | |
| *H04W 80/10* | (2009.01) | |
| *H04W 84/12* | (2009.01) | |
| *H04W 88/08* | (2009.01) | |
| *H04W 88/18* | (2009.01) | |
| *H04W 84/04* | (2009.01) | |
| *H04W 88/12* | (2009.01) | |
| *H04W 88/14* | (2009.01) | |
| *H04W 88/16* | (2009.01) | |

(52) U.S. Cl.
CPC ............ *H04J 11/00* (2013.01); *H04J 11/0086* (2013.01); *H04L 1/1812* (2013.01); *H04L 1/1861* (2013.01); *H04L 1/1864* (2013.01); *H04L 1/1893* (2013.01); *H04L 5/0035* (2013.01); *H04L 5/0055* (2013.01); *H04L 5/0057* (2013.01); *H04L 5/0073* (2013.01); *H04L 5/14* (2013.01); *H04L 41/069* (2013.01); *H04L 41/5032* (2013.01); *H04L 43/16* (2013.01); *H04L 65/60* (2013.01); *H04L 65/602* (2013.01); *H04L 67/10* (2013.01); *H04W 4/70* (2018.02); *H04W 8/08* (2013.01); *H04W 24/02* (2013.01); *H04W 24/08* (2013.01); *H04W 24/10* (2013.01); *H04W 28/0205* (2013.01); *H04W 28/0215* (2013.01); *H04W 28/0252* (2013.01); *H04W 28/0268* (2013.01); *H04W 28/08* (2013.01); *H04W 28/16* (2013.01); *H04W 36/0061* (2013.01); *H04W 36/0066* (2013.01); *H04W 36/0083* (2013.01); *H04W 36/0085* (2018.08); *H04W 36/0088* (2013.01); *H04W 36/14* (2013.01); *H04W 36/22* (2013.01); *H04W 40/005* (2013.01); *H04W 40/246* (2013.01); *H04W 48/16* (2013.01); *H04W 48/20* (2013.01); *H04W 52/0209* (2013.01); *H04W 52/0212* (2013.01); *H04W 52/0235* (2013.01); *H04W 52/04* (2013.01); *H04W 52/14* (2013.01); *H04W 72/02* (2013.01); *H04W 72/042* (2013.01); *H04W 72/044* (2013.01); *H04W 72/0406* (2013.01); *H04W 72/0413* (2013.01); *H04W 72/0453* (2013.01); *H04W 72/0486* (2013.01); *H04W 72/082* (2013.01); *H04W 72/1284* (2013.01); *H04W 74/002* (2013.01); *H04W 74/004* (2013.01); *H04W 76/12* (2018.02); *H04W 76/15* (2018.02); *H04W 76/16* (2018.02); *H04W 76/23* (2018.02); *H04W 76/27* (2018.02); *H04W 76/28* (2018.02); *H04W 76/30* (2018.02); *H04W 88/02* (2013.01); *H04L 5/001* (2013.01); *H04W 72/005* (2013.01); *H04W 80/10* (2013.01); *H04W 84/042* (2013.01); *H04W 84/12* (2013.01); *H04W 88/06* (2013.01); *H04W 88/08* (2013.01); *H04W 88/12* (2013.01); *H04W 88/14* (2013.01); *H04W 88/16* (2013.01); *H04W 88/18* (2013.01); *Y02D 30/70* (2020.08)

(58) Field of Classification Search
USPC .......................................................... 370/235
See application file for complete search history.

(56) References Cited

U.S. PATENT DOCUMENTS

| | | | | |
|---|---|---|---|---|
| 2005/0097209 A1* | 5/2005 | McDonagh | ........... | H04L 41/046 709/224 |
| 2005/0128998 A1* | 6/2005 | Jelitto | .................. | H04L 1/0001 370/349 |
| 2005/0157676 A1* | 7/2005 | Kwak | ............... | H04W 72/0426 370/328 |
| 2007/0030826 A1* | 2/2007 | Zhang | ............... | H04W 36/0011 370/331 |
| 2007/0174449 A1 | 7/2007 | Gupta | | |
| 2008/0113683 A1* | 5/2008 | Paas | .................. | H04M 1/72519 455/552.1 |
| 2008/0225853 A1* | 9/2008 | Melman | .............. | H04L 12/4625 370/392 |
| 2009/0011768 A1* | 1/2009 | Seok | ................... | H04L 41/5003 455/450 |
| 2009/0274104 A1* | 11/2009 | Addy | ..................... | H04M 11/04 370/329 |
| 2010/0202427 A1 | 8/2010 | Xia et al. | | |
| 2010/0226339 A1* | 9/2010 | Stephenson | ........... | H04W 24/08 370/332 |
| 2010/0304737 A1 | 12/2010 | Jain et al. | | |
| 2012/0023189 A1* | 1/2012 | Giaretta | ................ | H04W 48/18 709/217 |
| 2012/0082032 A1* | 4/2012 | Chen | ................. | H04W 72/1278 370/232 |
| 2012/0099428 A1* | 4/2012 | Kamdar | ............. | H04L 41/5022 370/235 |

(56) References Cited

U.S. PATENT DOCUMENTS

| | | | | |
|---|---|---|---|---|
| 2012/0224481 | A1* | 9/2012 | Babiarz | H04L 43/0876 370/230.1 |
| 2012/0224485 | A1 | 9/2012 | Payyappilly et al. | |
| 2012/0300712 | A1 | 11/2012 | Hakola et al. | |
| 2012/0322450 | A1* | 12/2012 | Karaoguz | H04W 36/30 455/436 |
| 2013/0003706 | A1 | 1/2013 | Kezys | |
| 2013/0039196 | A1* | 2/2013 | Bodog | H04L 41/00 370/252 |
| 2013/0272287 | A1 | 10/2013 | Xiang et al. | |
| 2014/0092742 | A1* | 4/2014 | Chou | H04W 76/28 370/235 |

FOREIGN PATENT DOCUMENTS

| | | |
|---|---|---|
| WO | 2011085806 A1 | 7/2011 |
| WO | 2011/147465 A1 | 12/2011 |
| WO | 2011149533 A1 | 12/2011 |
| WO | 2012/025825 A2 | 3/2012 |
| WO | 2012062373 A1 | 5/2012 |

OTHER PUBLICATIONS

International Search Report and Written Opinion for International Application No. PCT/US2013/060433, dated Dec. 31, 2013.
Juho Pirskanen et al. "Considerations on Cellular Traffic Offloading Use case in 802.11ah", IEEE 802.11-11/1011-00, IEEE P802.11 Wireless LANs, Jun. 27, 2011.
3GPP, "Technical Specification Group Services and System Aspects; Telecommunication Management; Home Node B (HNB) and Home eNode B (HeNB) management; Type 2 interface concepts and requirements (Release 11)," 3GPP TS 32.571 V11.0.0 (Sep. 2012), 10 pages.
Office Action dated Nov. 16, 2015 from Korean Patent Application No. 2015-7004936.
Office Action dated Feb. 2, 2016 from Japanese Patent Application No. 2015-533156, 4 pages.
Joey Chou, "UID-560036 SI report—Study on WLAN impacts to Type-2 management rapporteur report," 3GPP TSG-SA5 (Telecom Management), S5-121661, Agenda Item: 6.8.1, Aug. 20-24, 2012, Berlin, Germany, 4 pages.
Migaldi et al., "An Architecture to Develop Network Management Standards," IEEE C802.16g-05/042, IEEE P802.16g Broadband Wireless Access Working Group <http://ieee.802.org/16>, Sep. 9, 2005, 15 pages.
Huawei, "New use case on Load balancing based on operator's load level," 3GPP TSG-SA WG1 #58, S1-121119, Ag. Item: 9.8, May 7-11, 2012, Sevilla, Spain, 4 pages.
Huawei, "New use case on Load balancing based on operator's load level," 3GPP TSG-SA WG1 #59, S1-122111, Ag. Item: 9.6, Jul. 30-Aug. 3, 2012, Chicago, USA, 4 pages.
Huawei et al., "New use case on Load balancing based on operator's load level," 3GPP TSG-SA WG1 #59, S1-122505, Ag. Item: 9.6, Jul. 30-Aug. 3, 2012, Chicago, USA, 4 pages.
Intel, "Text proposal to WLAN management TR," 3GPP TSG SA WG5 (Telecom Management) Meeting #84, S5-121724, Agenda Item: 6.8.1, Aug. 20-24, 2012, Berlin, Germany, 4 pages.
Extended European Search Report dated Oct. 10, 2016 for European Patent Application No. 13842906.3, 10 pages.
First Office Action dated Aug. 30, 2017 from Chinese Patent Application No. 201380044886.3, 21 pages.
Notification of Reasons for Refusal dated Aug. 8, 2017 from Japanese Divisional Application No. 2016-171332, 5 pages.
Ericsson et al., "TS 32.571 Version 2.0.0—Telecommunication management; Home Node B (HNB) and Home eNode B (HeNB) management; Type 2 interface concepts and requirements," Technical Specification Group Services and System Aspects TSGS#47(10)0055, Mar. 22-25, 2010, Meeting #47; Vienna, Austria, 3GPP TSG-SA5 (Telecom Management) S5-100597, Mar. 1-5, 2010, Meeting SA5#70, P.R. China, 12 pages.
Motorola et al., "Study on Integration of device management information with Itf-N," Technical Specification Group Services and System Aspects TSGS#47(10)00070, Mar. 22-25, 2010, Meeting #47; Vienna, Austria, 3GPP TSG-SA5 (Telecom Management) S5-101015, Mar. 1-5, 2010, Meeting SA5#70, Xiamen, P.R. China, 23 pages.

* cited by examiner

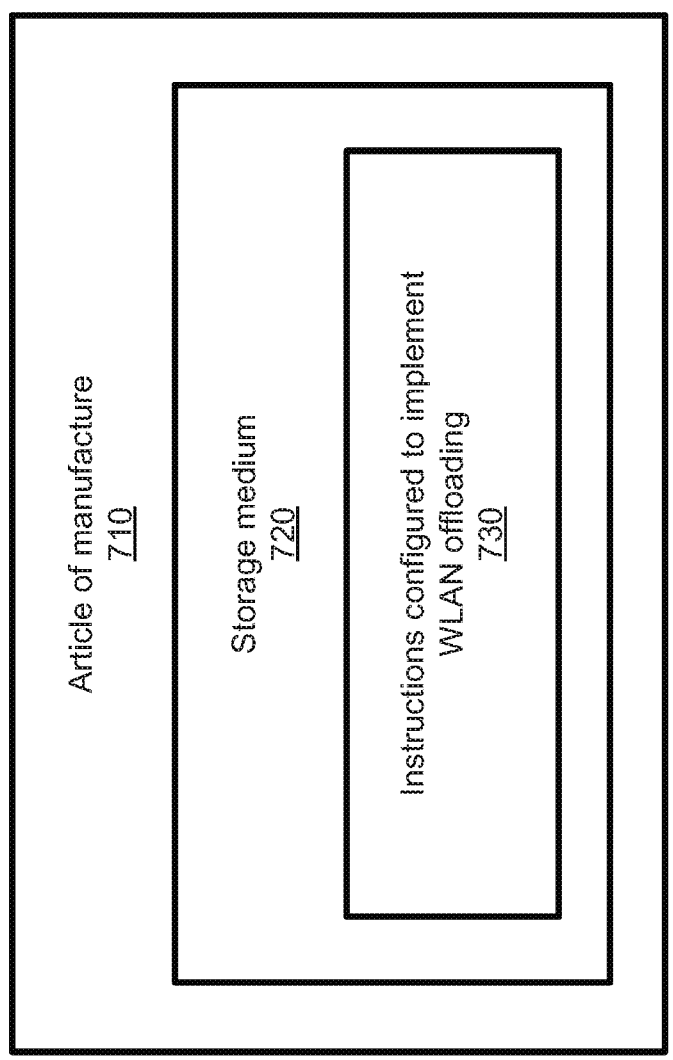

MANAGEMENT APPARATUS AND METHOD TO SUPPORT WLAN OFFLOADING

CROSS-REFERENCE TO RELATED APPLICATION

This application is a continuation of U.S. patent application Ser. No. 13/830,381, filed Mar. 14, 2013, entitled "MANAGEMENT APPARATUS AND METHOD TO SUPPORT WLAN OFFLOADING," which claims priority to U.S. Provisional Patent Application No. 61/707,784, entitled "ADVANCED WIRELESS COMMUNICATION SYSTEMS AND TECHNIQUES", and filed Sep. 28, 2012. The entirety of the above-listed applications are hereby incorporated herein by reference.

TECHNICAL FIELD

The present disclosure relates generally to wireless communication, and more particularly, to management apparatus and method to support wireless local area network (WLAN) offloading.

BACKGROUND

Global mobile data traffic grew rapidly in recent years due to accelerated adoption of mobile devices such as smartphones and tablets, and emergence of cloud computing applications. Scaling network capacity through deployments of additional base stations or advanced technology upgrades may not able to keep up with the ever-increasing demand for mobile data. Therefore, WLAN offloading may be used to mitigate traffic congestion by offloading significant amount of mobile data traffic from cellular networks without the need of further network upgrades or expansions. However, WLAN offloading has yet been unable to assume such a role because the behavior of WLAN is not yet known by cellular operators. For example, WLAN performance data is not available in 3rd Generation Partnership Project (3GPP) systems, since cellular networks and WLANs are managed by two independent operations, administration, maintenance & provisioning (OAM&P or OAMP) systems.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 7 illustrates an article of manufacture having programming instructions, incorporating aspects of the present disclosure, in accordance with various embodiments.

DETAILED DESCRIPTION

Figure 1:
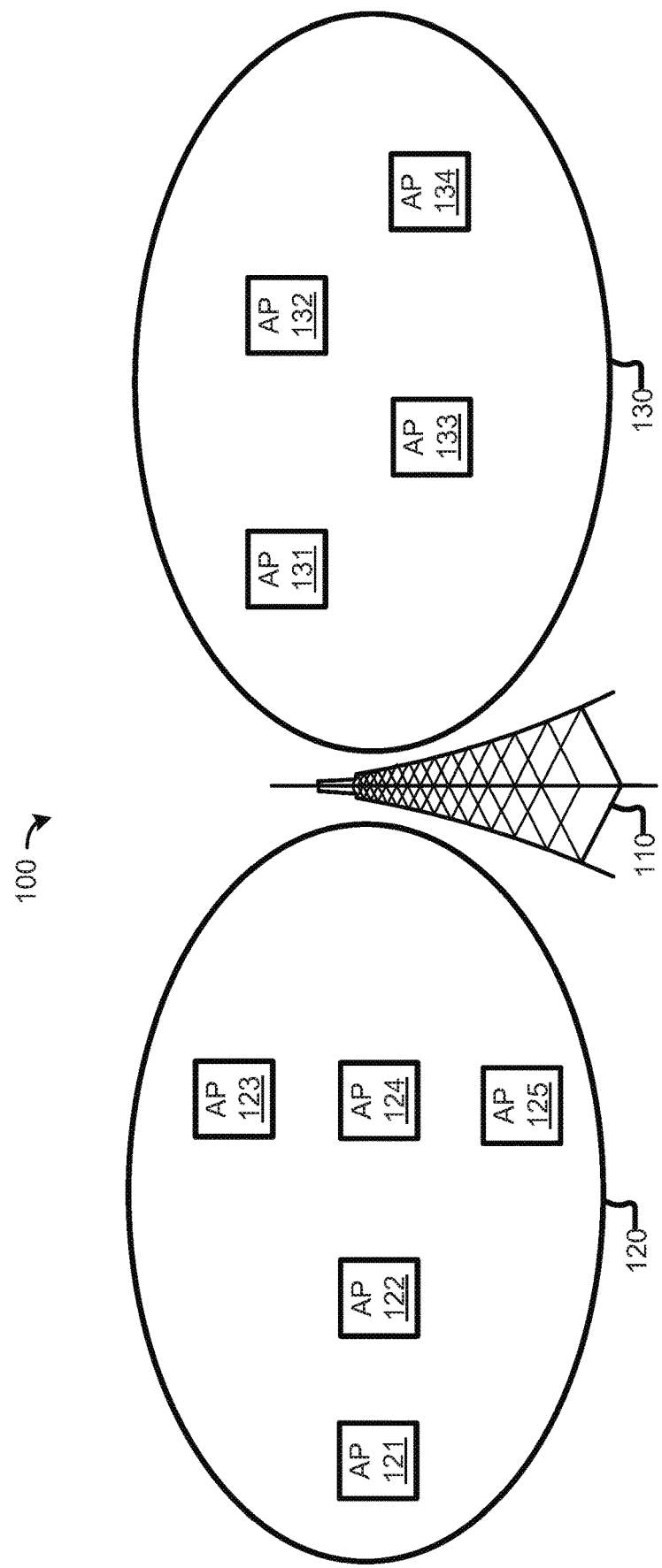
FIG. 1 illustrates an environment in which coverage areas of multiple access points (APs) are overlaid with cells in a cellular network to support WLAN offloading, in accordance with various embodiments.

Embodiments of systems and techniques are described for supporting WLAN offloading. In some embodiments, a network management system (NMS) for supporting WLAN offloading may include a network manager (NM); a first element manager (EM), coupled to the network manager, to communicate with the network manager and one or more WLANs; and a second EM, coupled to the NM, to communicate with the NM and one or more base stations of a cellular network. The coverage area of at least one access point (AP) of the one or more WLANs is overlaid with at least one of the one or more cells to support a WLAN offloading operation. Further, the NM is to activate the WLAN offloading operation based at least in part on at least one indicator received from the one or more WLANs. Other embodiments may be described and claimed.

The systems and techniques disclosed herein may enable a 3 GPP operations, administration, maintenance (OAM) system to monitor WLAN performance measurements and alarms to support WLAN offloading and evaluate the performance of WLAN offloading. The systems and techniques disclosed herein may enable better network planning by supporting WLAN offloading. The systems and techniques disclosed herein may also improve resource management in a cellular network without overprovisioning to accommodate peak traffic. The present disclosure may be particularly advantageous in WLAN offloading applications, including those in which WLAN APs may be connected via an interface unknown or unstandardized in 3GPP.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The description may use the phrases "in an embodiment", or "in embodiments", which may each refer to one or more of the same or different embodiments. Furthermore, the terms "comprising", "including", "having", and the like, as used with respect to embodiments of the present disclosure, are synonymous.

As may be used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, an environment 100 is illustrated in which coverage areas of multiple access points are variously overlaid with cells in a cellular network to support WLAN offloading. For example, coverage areas of access points 121-125 may be overlaid with cell 120, while coverage areas of access points (APs) 131-134 may be overlaid with cell 130. In embodiments, enhanced nodeB/nodeB (eNB/NB) 110 may provide one or both cells 120 and 130, while access points 121-125 and 131-134 may provide respective WLANs. As used herein, eNBs and NBs may be generically referred to as base stations. In embodiments, the cellular network may be an evolved universal terrestrial radio access network (E-UTRAN), universal mobile telecommunications system terrestrial radio access network (UTRAN), or a global system for mobile communications enhanced data rates for global system for mobile communication evolved radio access network (GERAN). In embodiments, an AP or eNB/NB may be provisioned with or restricted from specific functions or resources depending on the nature and the design of network, the condition of the WLAN or the cellular network, the choice of network users, among other variables.

In environment 100, the cellular network may be configured to deliver any of a number of services, such as data traffic, voice traffic, multimedia delivery over HTTP, live streaming over RTP, conversational services (e.g., video conferencing), and TV broadcasting, for example. In environment 100, the performance to deliver a service may be limited by the network capacity. The capacity of eNB/NB 110 may be increased by the capacity of APs 121-125 and 131-134. In embodiments, it may be possible for the eNB/NB 110 to offload traffic to one or more APs, such as APs 121-125, or vice versa due to the overlapping coverage of the WLAN with cell 120. In embodiments, the relations between cells and WLANs may be configured by the network operator. When an AP or an eNB/NB has a defect, the total capacity of the cell can be impacted, and a WLAN alarm or a cell alarm may be generated. In embodiments, WLAN or cell alarm reporting may trigger the adjustment of the offloading traffic that the eNB/NB 110 expects to offload to APs based on the relationship between the eNB/NB 110 and the APs. In embodiments, performance measurements of WLAN or cell may similarly trigger WLAN offloading operations. In embodiments, a traffic volume threshold or traffic type filter may be set to guide WLAN offloading operations. For example, the offloading volume threshold of cell 120 may be set at 30% denoting that 30% of traffic in cell 120 traffic is expected to be offloaded to APs 121-125. When it is detected, for example, that AP 122 and 124 have faults, the offloading volume threshold may be adjusted, for example, lowered to 18%. In embodiments, the distribution of traffic among cells 120 and 130 may be based on the traffic loads of cells 120 and 130 (e.g., to balance the loads on cells 120 and 130 ), for example. Accordingly, WLAN offloading may be carried out from an eNB/NB in one cell to APs in another cell. For example, an eNB/NB of cell 120 may be allowed to offload a part of its traffic to AP 131 and/or 132 in cell 130. Additional embodiments are described herein.

Figure 2:
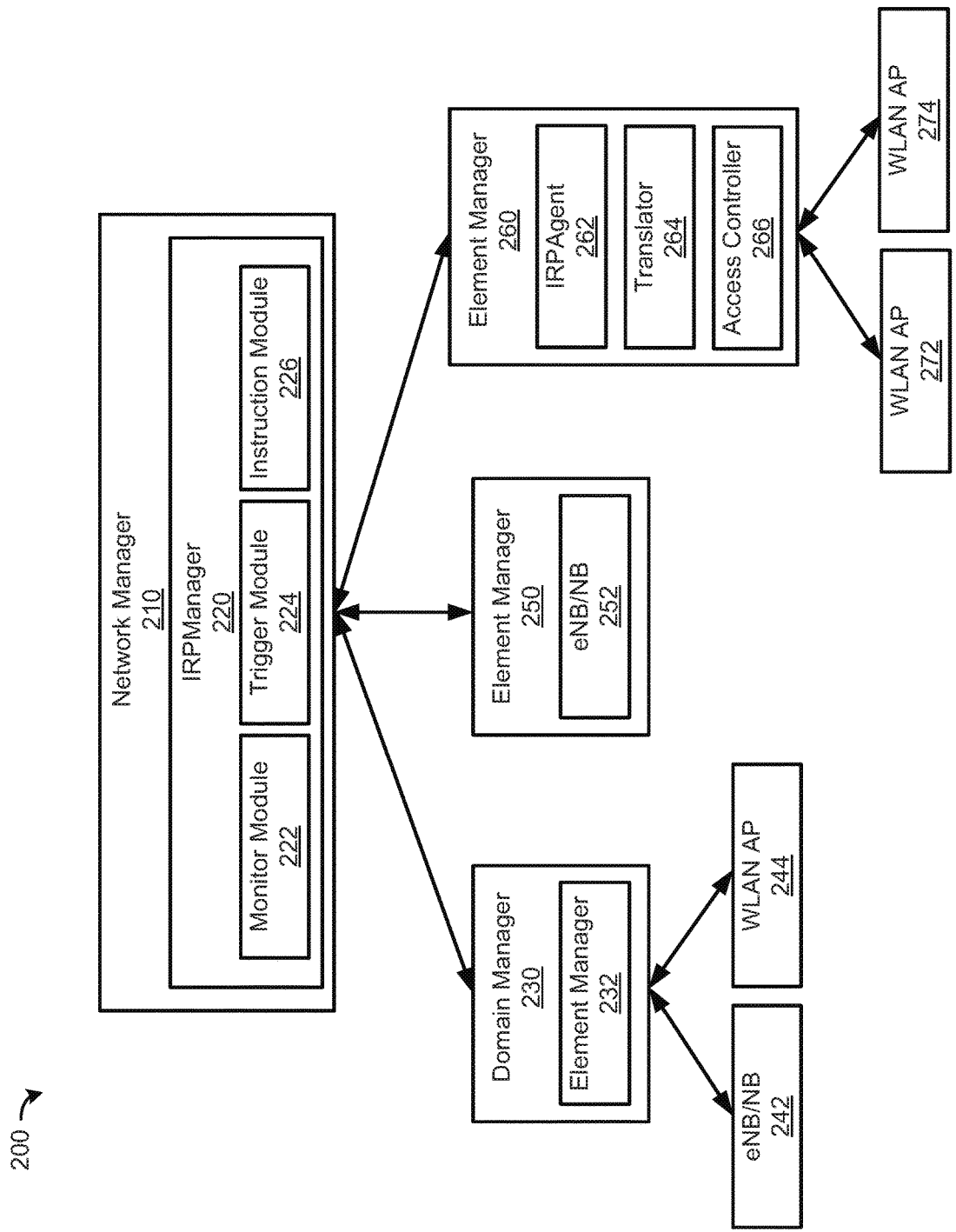
FIG. 2 is a block diagram illustrating an example network management system in supporting WLAN offloading, in accordance with various embodiments.

Referring now to FIG. 2, a block diagram illustrating example network management system 200 in supporting WLAN offloading is illustrated, in accordance with various embodiments. In network management system 200, there are various network entities connected via logical connections known as interfaces. For example, network elements (NEs) may be discrete telecommunications entities, which may be managed over a specific interface suitable to a particular NE. For another example, element managers (EMs) may manage a set of closely related types of NEs through a host of end-user functions including element management functions and sub-network management functions. Element management functions may enable an EM to manage NEs individually. Yet for another example, domain managers (DMs) may provide domain management functions for a sub-network. Yet for another example, network manager (NM) may take the responsibility for the management of a network in which such responsibility may be supported by EMs or DMs.

Each network entity in network management system 200 may include receiver/transmitter module (not shown). Receiver/transmitter module may be configured for receiving and transmitting signals to and from other devices by wired or wireless connections. For example, receiver/transmitter module may be configured to receive signals from or transmit signals to an NE, an EM, a DM, or an NM. Communication within a cellular network may be based on standardized interfaces supporting management of multi-vendor and multi-technology NEs. Communication between a cellular network and a WLAN may be based on non-standardized interfaces.

In embodiments, network management system 200 may include NM 210 and various EMs such as EM 232, 250, and 260 in managing various NEs such as eNB/NB 242 and 252, or WLAN AP 244, 272 and 274. NEs may additional include communication system entities that are not shown in FIG. 2. Examples of additional NEs may include user equipment (UE), switches, routers, or any other communication system component. In embodiments, DMs may be located in the midst of the management hierarchy wherein an EM may be managed by a DM. For example, DM 230 may manage EM 232 and be managed by NM 210.

In embodiments, NM 210 may monitor the entities of network management system 200 and collect measurements of their performance and the relationships within the entities. Based on the analysis of these measurements and relationships, NM 210 may identify potential problems and improvements in the configuration and operation of network management system 200.

For WLAN offloading, WLAN performance data may be used to monitor the quality of service (QoS) a network subscriber may receive. In embodiments, the WLAN performance may be monitored by various parameters, for example, data volume (DV) and the number of associated UEs (UE#). In embodiments, DV may be used to measure data volume on a MAC layer or an IP layer level per elapsed time unit. DV may be indicative of the load in a WLAN AP. For example, a number of possible performance measurement counters from the WLAN AP may be mapped and then delivered to an NM such as ifInOctets and ifOutOctets as defined in IETF RFC 2863. In embodiments, the number of UEs that are connected to a WLAN AP may be used to determine how many users are associated with a given WLAN AP. It may be an indication of poor WLAN performance if lower packet throughput is generated from a large number of associated UEs. For example, a number of possible performance measurement counters from the WLAN AP indicative of UE# may be mapped and then delivered to an NM such as the counter of dot11AssociatedStationCount in IEEE802dot11-management information base (MIB) of IEEE 802.11.

In embodiments, various networking devices in network management system 200 may be configured to support WLAN offloading operations. In embodiments, the WLAN offloading operations described herein may be performed in whole or in part by interactions between NM 210 and various EMs such as EM 260. In embodiments, NM 210 may use information provided by one or more EMs such as EM 260 or 250 for any of a number of WLAN offloading applications, including triggering a WLAN offloading operation among different NEs. A number of functions that may be performed by NM 210 are described herein. In embodiments, EM 260 may facilitate communication between an NE such as WLAN AP 272 and NM 210 across different types of interfaces. For example, EM 260 may communicate with WLAN AP 272 via a type-1 interface unknown in 3GPP but communicate with NM 210 via a type-2 interface known in 3GPP. In embodiments, the type-1 interface may be implemented according to a standardized protocol in IEEE 802.11 or a proprietary protocol used by an AP. In embodiments, the type-2 interface may be a standardized interface in 3GPP.

Referring now to element manager 260, illustrative components of EM 260 are shown. EM 260 may include IRPAgent 262, translator 264, and access controller (AC) 266. AC 266 may be configured to communicate management information with WLAN APs via a type-1 interface. In some embodiments, management information may include WLAN performance monitoring information, WLAN alarm reporting information, WLAN offloading information, WLAN management information. For example, WLAN AP 272 may report its performance measurements to AC 266 regarding transmitted fragment counts, received fragment counts, discarded fragment counts, failed fragment counts, etc. As another example, WLAN AP 272 may report alarms to AC 266 regarding severe network congestions or other critical conditions.

IRPAgent 262 may be configured to communicate management information with an IRP manager of an NM via a type-2 interface. In some embodiments, management information may include WLAN performance monitoring information, WLAN alarm reporting information, WLAN offloading information, WLAN management information. For example, the type-2 interface may be a performance management integration reference point (PMIRP) interface, and IRPAgent 262 may be configured to communicate performance measurements of an AP to IRPManager 220 via the PMIRP interface. Accordingly, IRPAgent 262 may be configured to allow IRPManager 220 to acquire various performance measurements from various WLAN APs. As another example, the type-2 interface may be an alarm integration reference point (AlarmIRP) interface, and IRPAgent 262 may be configured to communicate a WLAN alarm to IRPManager 220 via the AlarmIRP interface. In another example, IRPAgent 262 may be configured to receive a WLAN offloading command or WLAN management command from IRPManager 220 via one or more standardized interfaces in 3GPP.

Translator 264 may be coupled with AC 266 and IRPAgent 262 and configured to map management information between AC 266 and IRPAgent 262 and enable crossover between type-1 and type 2 interfaces. In embodiments, standards from standards developing organizations (SDO) other than 3GPP may be adopted to support mapping management information between AC 266 and IRPAgent 262 because type-1 interface to WLAN AP may have not been standardized in 3GPP. For example, standards based on IEEE and IETF WLAN performance measurements or their derivatives may be used. In embodiments, translator 264 may use a QoS-counters table that provides counters to measure the performance of a WLAN AP. WLAN APs may report performance measurements in a form compatible with the QoS-counters table. Translator 264 may then translate the performance of WLAN APs to management information communicable over the type-2 interface based on the QoS-counters table.

The components illustrated above are examples. Any one or more components may be combined or omitted, or additional components may be included, in accordance with the disclosed embodiments. For example, in some embodiments, a single IRP agent may include at least some of the functionality of both IRPAgent 262 and translator 264. As another example, in some embodiments, a single IRP agent may include all functionalities of IRPAgent 262, translator 264, and AC 266 and, therefore, synthesize the function to bridge the communication between a network element such as WLAN AP 272 and a network manager such as NM 210 across both type-1 and type-2 interfaces. In another example, IRPAgent 262 may be integrated with an NM, AC 266 may be integrated with an NE, or they may be integrated with a computing device separate from EM 260, such as DM 230.

Referring now to IRPManager 220, illustrative components of IRPManager 220 are shown. IRPManager 220 may include monitor module 222, trigger module 224, and instruction module 226. Mobile data traffic may fluctuate rapidly and dynamically, therefore the performance measurements of both eNB/NB and WLAN APs may need to be collected and then analyzed on a regular basis to improve WLAN offloading performance. In embodiments, monitor module 222 may be configured to monitor multiple indicators of APs or eNB/NBs. The multiple indicators may be communicated from an EM, such as EM 260 which is in direct communication with WLAN APs 272 and 274. In some embodiments, indicators may include WLAN performance monitoring information or WLAN alarm reporting information. In some embodiments, indicators may include cell performance monitoring information or cell alarm reporting information. In some embodiments, indicators may include AP-cell overlapping information. For example, monitor module 222 may receive overlapping information from EM 250 regarding whether the coverage of eNB/NB 252 is partially overlapped by the coverage of one or more APs. In embodiments, overlapping information may include the strength of overlapping. The strength of overlapping may be useful in selecting candidate APs for WLAN offloading operations. Other indicators of various network conditions may also be monitored by monitor module 222.

Trigger module 224 may be coupled to monitor module 222 and configured to activate a WLAN offloading operation based at least in part on indicators received in monitor module 222. In some embodiments, WLAN offloading operations may be triggered when the load on a cell exceeds a predefined load threshold. In some embodiments, WLAN offloading operations may be triggered when WLAN performance measurements or WLAN alarms indicating an actual or expected congestion in a WLAN, for example, caused by an AP failure. Accordingly, WLAN offloading traffic may be reduced. In some embodiments, WLAN offloading operations may be triggered by a network setting. For example, in a certain point of time, e.g., during a daytime period of high demand, WLAN offloading may be implemented. In other embodiments, other various network attributes or the change of such attributes may trigger WLAN offloading operations.

Instruction module 226 may be coupled to the trigger module 224 and configured to instruct one or more eNB/NBs and the one or more WLAN APs to adjust offloading traffic between the one or more cells and the one or more WLANs when an offloading operation is triggered. In some embodiments, instruction module 226 may be configured to determine which eligible base stations should be instructed to execute a WLAN offloading operation, for example, based on the load level of base stations. In some embodiments, instruction module 226 may be configured to determine which eligible APs should be instructed to execute a WLAN offloading operation, for example, based on the performance measurements of APs. In some embodiments, instruction module 226 may set up a traffic volume threshold or a traffic type filter to gauge qualitative or quantitative attributes of WLAN offloading. For example, a traffic volume threshold may be set as a percentage of the overall traffic in a cell. As another example, a traffic type filter may be set to exclude VoIP traffic from WLAN offloading. In some embodiments, instruction module 226 may be configured to instruct APs or eNB/NBs to deactivate WLAN offloading operations, for example, when multiple APs experience an operational failure or all base stations have been offloaded.

The components illustrated above are examples. Any one or more components may be combined or omitted, or additional components may be included, in accordance with the disclosed embodiments. For example, in some embodiments, a single monitor module may include at least some of the functionality of both monitor module 222 and trigger module 224. As another example, in some embodiments, a single trigger module may include all functionalities of monitor module 222, trigger module 224, and instruction module 226, therefore synthesize the function to manager multiple element mangers such as EM 260 and 250, or domain managers such as DM 230. In embodiments, IRPManager 220 may be placed in a DM, and WLAN offloading operations may be managed by a domain manager such as DM 230. In embodiments, some or all components of IRPManager 220 may be placed in one or more eNB/NBs, and WLAN offloading operations may be managed by one or more eNB/NBs such as eNB/NB 252.

Figure 3:
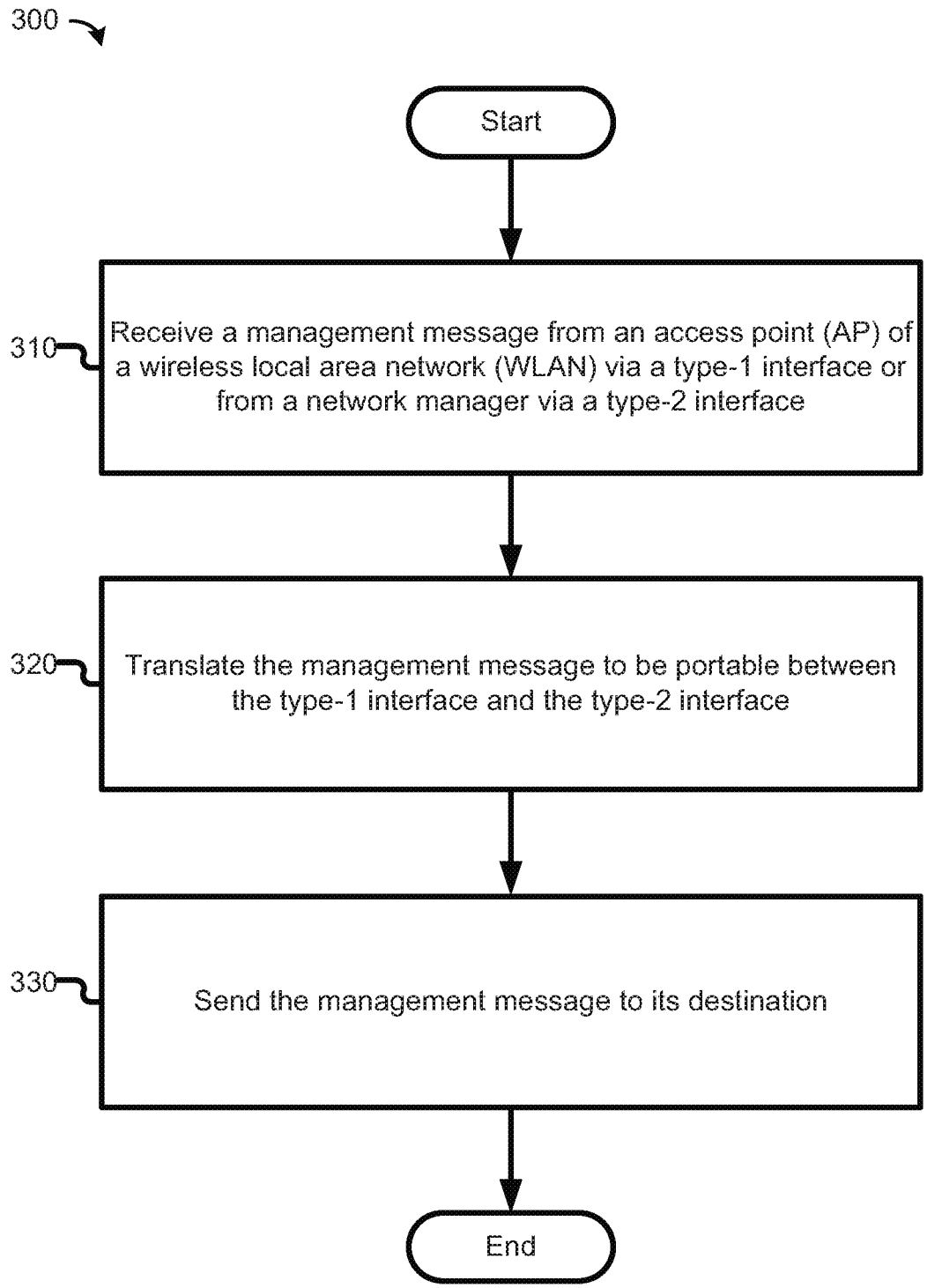
FIG. 3 is a flow diagram of an example management message passing process, in accordance with various embodiments.

Referring now to FIG. 3, a flow diagram of an example management message passing process 300 is illustrated, in accordance with various embodiments. Process 300 may be executed by, for example, EM 260 (FIG. 2). Process 300 may be executed by any of a number of other components of a wireless communication system that implement some or all of the functions described above in connection with EM 260. For example, process 300 may be executed by NM 210 (FIG. 2) or eNB/NB 110 (FIG. 1). It may be recognized that, while the operations of process 300 (and the other processes described herein) are arranged in a particular order and illustrated once each, in various embodiments, one or more of the operations may be repeated, omitted or performed in an order different than that described. For illustrative purposes, operations of process 300 may be described as performed by EM 260 (FIG. 2), but process 300 may be performed by any suitably configured device.

Process 300 may begin at operation 310, in which EM 260 may receive a management message from an access point of a wireless local area network, e.g. WLAN AP 272, via a type-1 interface or from a network manager, e.g. NM 210, via a type-2 interface. In some embodiments, operation 310 may be executed by AC 266 (FIG. 2), for example, based on information received from an AP such as WLAN performance monitoring information or WLAN alarm reporting information. In some embodiments, operation 310 may be executed by IRPAgent 262 (FIG. 2), for example, based on information received from IRPManager 220 (FIG. 2) such as a WLAN offloading information or a WLAN management information.

At operation 320, EM 260 may translate the management message to be portable between the type-1 interface and the type-2 interface. In embodiments, operation 320 may be executed by translator 264, for example, in which translator may map the management information exchanged over the type-1 interface into the management information that can be sent over the type-2 interface and vice versa. In embodiments, translator 264 may translate information of performance measurements received from a WLAN AP to be sent over a PMIRP interface in 3GPP. In embodiments, translator 264 may translate information of an alarm received from a WLAN AP to be sent over an alarm integration reference point (AlarmIRP) interface in 3GPP. In embodiments, translator 264 may translate WLAN AP management information received from IRPManager 220 to be sent over the type-1 interface. In embodiments, translator 264 may translate a WLAN AP offloading information received from IRPManager 220 to be sent over the type-1 interface. Other type of management information may be translated between the type-1 and type-2 interfaces.

In embodiments, standards from standards developing organizations (SDO) other than 3GPP may be adopted to support type-2 performance monitoring and alarm reporting for WLAN management as type-1 interface to WLAN AP is not standardized in 3GPP. For example, standards based on IEEE and IETF WLAN performance measurements or their derivatives may be used. As another example, the IEEE 802.11 MIB, as defined in IEEE 802.11-2007, may provide good sources of information for WLAN performance measurements.

In embodiments, translator 264 may use a QoS-counters table that provides counters to measure the performance of a WLAN AP. The WLAN AP may report its performance measurements in a form compatible with the QoS-counters table. Translator 264 may then translate the performance of the WLAN AP from the QoS-counters table to the type-2 interface. The following shows an example of such QoS-counters table.

```
dot11QosCountersTable OBJECT-TYPE
    SYNTAX SEQUENCE OF Dot11QosCountersEntry
    MAX-ACCESS not-accessible
    STATUS current
    DESCRIPTION
        "Group containing attributes that are MAC counters
        implemented as table to allow for multiple instantiations on
        an agent."
    ::= { dot11mac 6 }
dot11QosCountersEntry OBJECT-TYPE
    SYNTAX Dot11QosCountersEntry
    MAX-ACCESS not-accessible
    STATUS current
    DESCRIPTION
        "An Entry (conceptual row) in the EDCA Table. ifIndex -
        Each IEEE 802.11 interface is represented by an ifEntry.
        Interface tables in this MIB module are indexed by ifIndex."
    INDEX { ifIndex,
```

```
            dot11QosCountersIndex }
        ::= { dot11QosCountersTable 1 }
    Dot11QosCountersEntry ::= SEQUENCE {
        dot11QosCountersIndex INTEGER,
        dot11QosTransmittedFragmentCount Counter32,
        dot11QosFailedCount Counter32,
        dot11QosRetryCount Counter32,
        dot11QosMultipleRetryCount Counter32,
        dot11QosFrameDuplicateCount Counter32,
        dot11QosRTSSuccessCount Counter32,
        dot11QosRTSFailureCount Counter32,
        dot11QosACKFailureCount Counter32,
        dot11QosReceivedFragmentCount Counter32,
        dot11QosTransmittedFrameCount Counter32,
        dot11QosDiscardedFrameCount Counter32,
        dot11QosMPDUsReceivedCount Counter32,
        dot11QosRetriesReceivedCount Counter32}
```

At operation 330, EM 260 may send the management message to its destination. In embodiments, operation 330 may be executed by IRPAgent 262, for example, based on information received from a WLAN AP when the management message is intended to be sent to an IRP manager. For example, the type-2 interface may be a standardized interface in 3GPP such as a performance management integration reference point (PMIRP) interface, and IRPAgent 262 may then send multiple performance measurements in a management message to IRPManager 220 via the PMIRP interface. As another example, the type-2 interface may be a standardized interface in 3GPP such as an alarm integration reference point (AlarmIRP) interface, and IRPAgent 262 may then send one or more alarms in a management information to IRPManager 220 via the AlarmIRP interface. In embodiments, operation 330 may be executed by AC 266, for example, based on information received from an IRP manager when the management message is intended to be sent to a WLAN AP. For example, the type-1 interface may be implemented according to a standardized protocol in IEEE 802.11, such as control and provisioning of wireless access points (CAPWAP) which is based on lightweight access point protocol (LWAPP), AC 266 may then send a WLAN management information to WLAN AP 272. As another example, the type-1 interface may be a proprietary protocol used by WLAN AP 274, AC 266 may then send a WLAN offloading information to WLAN AP 274 via the proprietary protocol. Other protocols may be also used on the type-1 interface. In embodiments, process 300 may then end.

Figure 4:
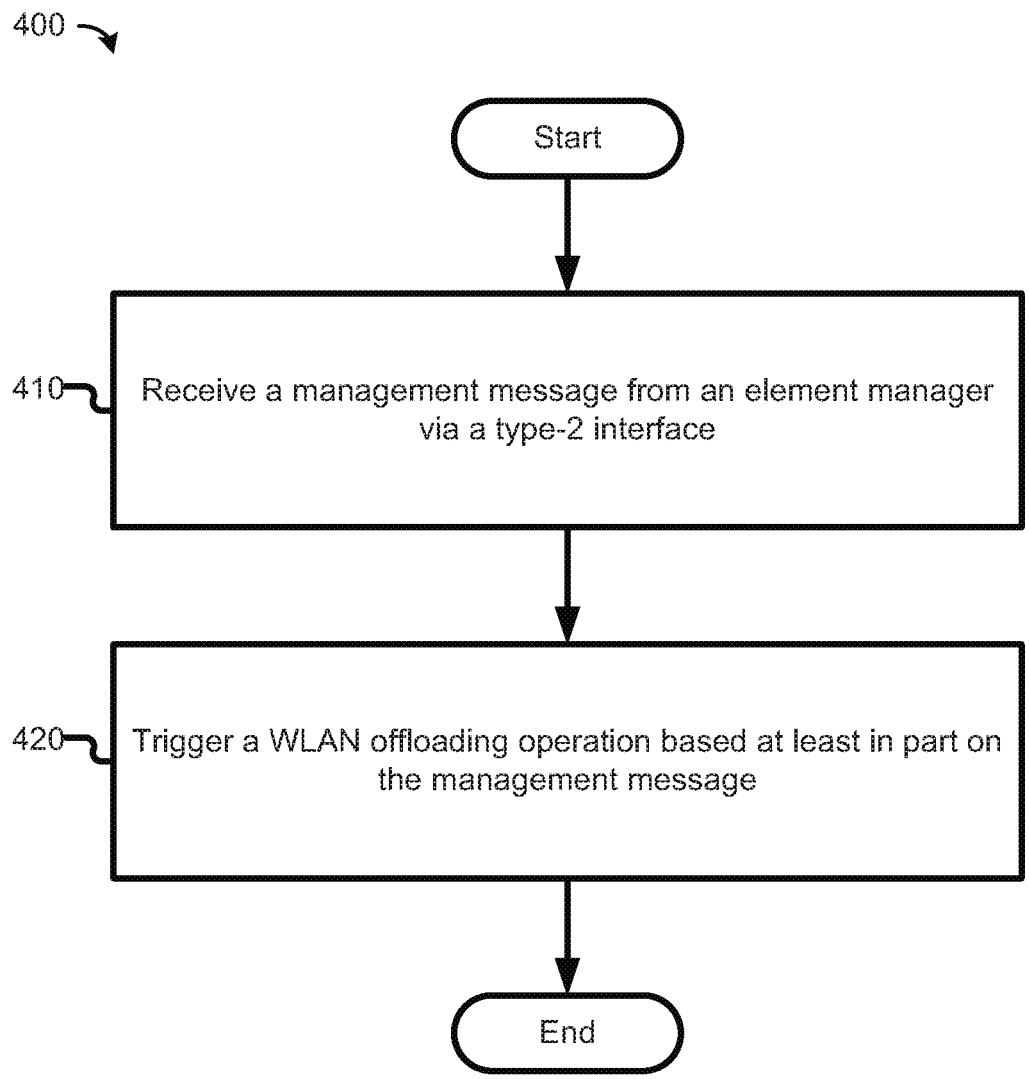
FIG. 4 is a flow diagram of an example WLAN offloading operation triggering process, in accordance with various embodiments.

Referring now to FIG. 4, a flow diagram of an example WLAN offloading operation triggering process 400 is illustrated, in accordance with various embodiments. Process 400 may be executed by, for example, NM 210 (FIG. 2). Process 400 may be executed by any of a number of other components of a wireless communication system that implement some or all of the functions described above in connection with NM 210. For example, process 400 may be executed by IRPManager 220 (FIG. 2) or eNB/NB 110 (FIG. 1). It may be recognized that, while the operations of process 400 are arranged in a particular order and illustrated once each, in various embodiments, one or more of the operations may be repeated, omitted or performed out of order. For illustrative purposes, operations of process 400 may be described as performed by IRPManager 220 (FIG. 2), but process 400 may be performed by any suitably configured device.

Process 400 may begin at operation 410, in which monitor module 222, for example, may receive a management message from an element manager, e.g. EM 232, 250, or 260, via a type-2 interface. In embodiments, the element manager may in direct communication with an AP of a WLAN or a base station of a cell. In some embodiments, the management message may include WLAN performance monitoring information received from an AP such as WLAN AP 272. In some embodiments, the management message may include WLAN alarm reporting information received from an AP such as WLAN AP 274. In some embodiments, the management message may include cell performance monitoring information received from an eNB/NB such as eNB/NB 242. In some embodiments, the management message may include cell alarm reporting information received from an eNB/NB such as eNB/NB 252. In embodiments, the management message may include information of the type and the amount of traffic to be offloaded from either a WLAN AP or an eNB/NB. Other management information may also be included in the management message.

At operation 420, IRPManager 220 may trigger a WLAN offloading operation based at least in part on the management message. In embodiments, operation 420 may be executed by trigger module 224 (FIG. 2) based on information received from an EM 232, 250, or 260. In embodiments, the WLAN offloading operation may be triggered by a WLAN alarm. Consequently, the WLAN offloading operation may be directed to offload traffic from an AP to an eNB/NB. In embodiments, the WLAN offloading operation may be triggered by a cell alarm. Consequently, the WLAN offloading operation may be directed to offload traffic from an eNB/NB to an AP. In embodiments, the WLAN offloading operation may be triggered to adjust the type and the amount or percentage of traffic that an eNB/NB is expected to offload to WLAN APs or vice versa so that the traffic load may be balanced, and the performance of the cellular network may be improved. Process 400 may then end.

In embodiments, in connection of FIG. 3 and FIG. 4, an example process may start with a fault in WLAN AP 272 causing the WLAN air interface link to go down. Next, AC 266 may receive an alarm from WLAN AP 272 via a type-1 interface as the result of its state change. For example, ifOperStatus defined in RFC 2863 may be transitioned from up to down. Next, translator 264 may translate this alarm received from WLAN AP to a state change notification portable via a type-2 interface. Next, IRPAgent 262 may send the state change notification to IRPManager 220 over the type-2 interface. Next, monitor module 222 may receive the state change notification. Finally, trigger module 224 may trigger a WLAN offloading operation based at least in part on the state change notification.

Figure 5:
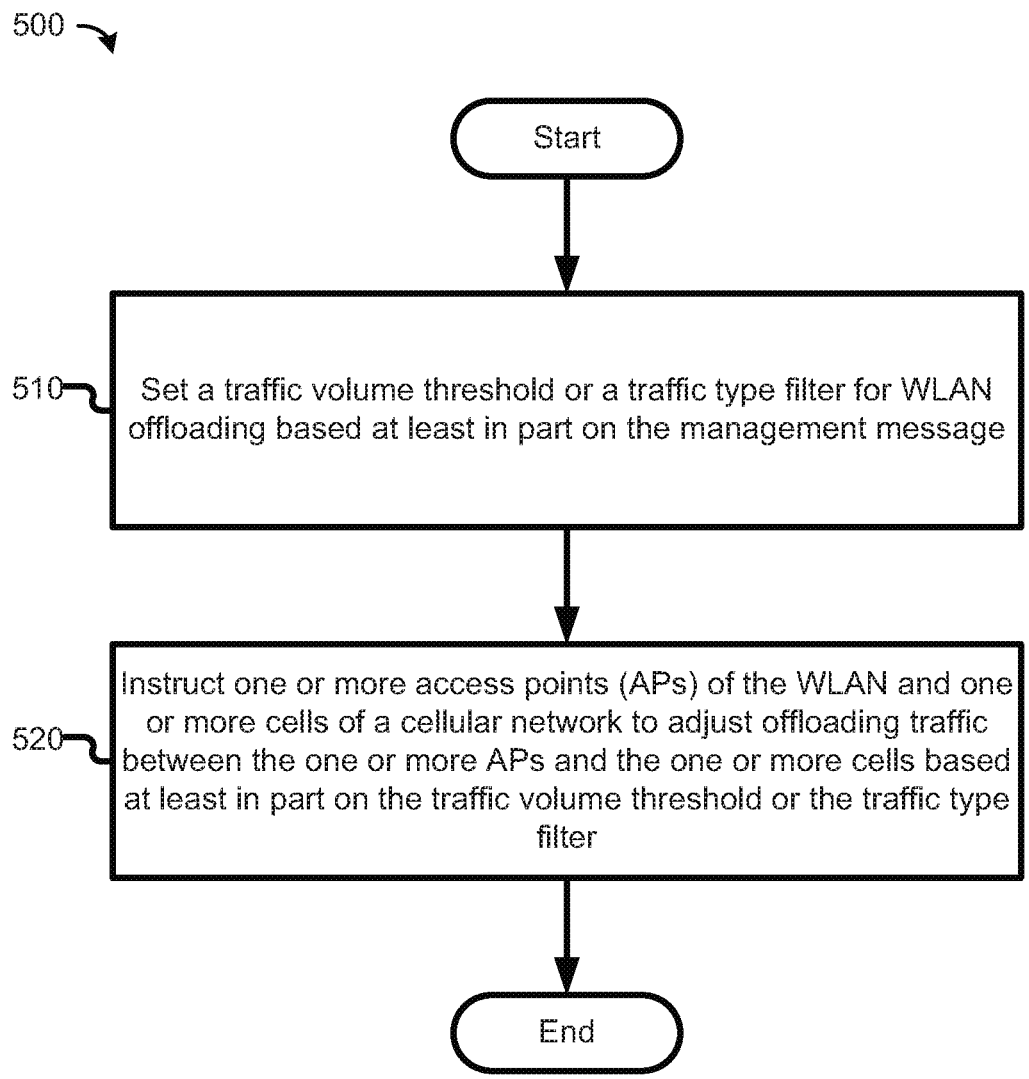
FIG. 5 is a flow diagram of an example WLAN offloading operation instructing process, in accordance with various embodiments.

Referring now to FIG. 5, a flow diagram of an example WLAN offloading operation instructing process 500 is illustrated, in accordance with various embodiments. Process 500 may be executed by, for example, NM 210 (FIG. 2). Process 500 may be executed by any of a number of other components of a wireless communication system that implement some or all of the functions described above in connection with NM 210. For example, process 500 may be executed by IRPManager 220 (FIG. 2), DM 230 (FIG. 2), or suitable components in cellular tower 110 (FIG. 1). It may be recognized that, while the operations of process 500 are arranged in a particular order and illustrated once each, in various embodiments, one or more of the operations may be repeated, omitted or performed in order other than that described. For illustrative purposes, operations of process 500 may be described as performed by IRPManager 220 (FIG. 2), but process 500 may be performed by any suitably configured device.

Process 500 may begin at operation 510, in which instruction module 226, for example, may set a traffic volume threshold and/or a traffic type filter for WLAN offloading based at least in part on the management message. In embodiments, traffic volume threshold may be set based on an absolute volume of data such as 1 kilobit, megabit, gigabit, or terabit. In embodiments, traffic volume threshold may be set based on an absolute data transfer rate such as 1 kilobit per second (Kbps), megabit per second (Mbps), or gigabit per second (Gbps). In embodiments, traffic volume threshold may be set based on a relative percentage of traffic such as 50% of the designed bandwidth of a WLAN AP. In embodiments, traffic type filter may be set based on the application of traffic such as voice over IP (VoIP), web, email, file transfer, or game. In embodiments, traffic type filter may be set based on the protocol of traffic such as Transmission Control Protocol (TCP), User Datagram Protocol (UDP), Internet Control Message Protocol (ICMP), etc. in Internet Protocol (IP); or Packet Data Convergence Protocol (PDCP), Radio Resource Control (RRC), etc. in 3GPP Long Term Evolution (LTE) protocol stack. In embodiments, traffic type filter may be set based on time of traffic such as time of day, day of week, or month of year. In embodiments, traffic type filter may be set based on packet level characteristics such as packet sizes or flow level characteristics such as flow durations. Traffic volume threshold or traffic type filter may set based on other metrics or purposes.

In embodiments, an alarm received from a WLAN AP or an eNB/NB may indicate actual traffic overloading experienced by or predicated traffic congestion would be experienced by the WLAN AP or the eNB/NB. Accordingly, a traffic volume threshold and/or a traffic type filter may bet set for WLAN offloading operations based on the alarm to alleviate the actual or predicated traffic overloading or congestion. In embodiments, performance measurements received from a WLAN AP or an eNB/NB such as latency or throughput may indicate actual traffic overloading experienced by or predicated traffic congestion would be experienced by the WLAN AP or the eNB/NB. Performance measurements, in connection with other traffic engineering techniques or knowledge such as queuing theory, the nature of traffic, the traffic models, the nature of networking equipment, etc. may be used to evaluate current traffic conditions or predict future network issues. Accordingly, a traffic volume threshold and/or a traffic type filter may bet set based on received performance measurements to plan for WLAN offloading operations. Such operations may help a cellular network to provide reliable service at lower cost without overprovisioning.

At operation 520, instruction module 226, for example, may instruct one or more APs and one or more base stations to initiate or adjust offloading traffic between the one or more APs and the one or more base stations based at least in part on the traffic volume threshold or the traffic type filter. In embodiments, instruction module 226 may determine one or more WLAN APs and one or more base stations to execute a WLAN offloading operation based on their respective conditions such as a load threshold for an eNB/NB or an AP. Accordingly, instruction module 226 may instruct these network elements to initiate or adjust offloading traffic among them. Process 500 may then end.

Figure 6:
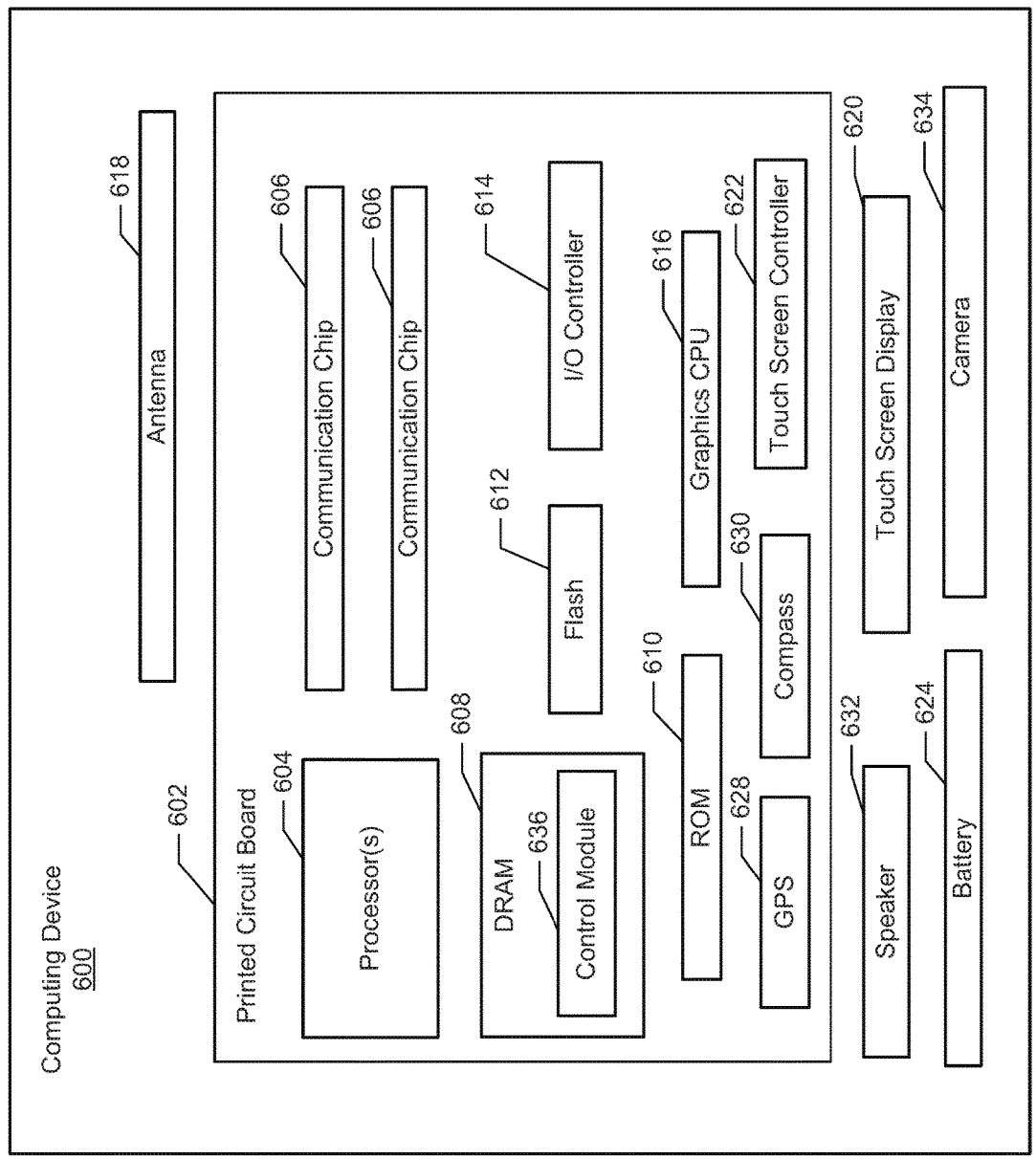
FIG. 6 is a block diagram of an example computing device suitable for practicing the disclosed embodiments, in accordance with various embodiments.

FIG. 6 is a block diagram of example computing device 600, which may be suitable for practicing various disclosed embodiments. For example, some or all of the components of computing device 600 may be used in any of the components of system 200 of FIG. 2. Computing device 600 may include a number of components, including one or more processor(s) 604 and at least one communication chip 606. In various embodiments, processor 604 may include a processor core. In various embodiments, at least one communication chip 606 may also be physically and electrically coupled to processor 604. In further implementations, communication chips 606 may be part of processor 604. In various embodiments, computing device 600 may include PCB 602. For these embodiments, processor 604 and communication chip 606 may be disposed thereon. In alternate embodiments, the various components may be coupled without the employment of PCB 602. Communication chip 606 may be included in any of the receiver and/or transmitter modules described herein.

Depending on its applications, computing device 600 may include other components that may or may not be physically and electrically coupled to PCB 602. These other components include, but are not limited to, volatile memory (e.g., dynamic random access memory 608, also referred to as DRAM), non-volatile memory (e.g., read-only memory 610, also referred to as one or more hard disk drives, one or more solid-state drives, one or more compact disc drives, and/or one or more digital versatile disc drives), flash memory 612, input/output controller 614, a digital signal processor (not shown), a crypto processor (not shown), graphics processor 616, one or more antenna 618, touch screen display 620, touch screen controller 622, other visual display devices (such as liquid-crystal displays, cathode-ray tube displays and e-ink displays, not shown), battery 624, an audio codec (not shown), a video codec (not shown), global positioning system (GPS) device 628, compass 630, an accelerometer (not shown), a gyroscope (not shown), speaker 632, camera 634, and a mass storage device (such as hard disk drive, a solid state drive, compact disc (CD), digital versatile disc (DVD)) (not shown), and so forth. In various embodiments, processor 604 may be integrated on the same die with other components to form a System on Chip (SoC).

In various embodiments, volatile memory (e.g., DRAM 608), non-volatile memory (e.g., ROM 610), flash memory 612, and the mass storage device may include programming instructions configured to enable computing device 600, in response to execution by processor(s) 604, to practice all or selected aspects of the processes described herein. For example, one or more of the memory components such as volatile memory (e.g., DRAM 608), non-volatile memory (e.g., ROM 610), flash memory 612, and the mass storage device may include temporal and/or persistent copies of instructions that, when executed, enable computing device 600 to operate control module 636 configured to practice all or selected aspects of the processes described herein. Memory accessible to computing device 600 may include one or more storage resources that are physically part of a device on which computing device 600 is installed and/or one or more storage resources that is accessible by, but not necessarily a part of, computing device 600. For example, a storage resource may be accessed by computing device 600 over a network via communications chips 606.

Communication chips 606 may enable wired and/or wireless communications for the transfer of data to and from computing device 600. The term "wireless" and its derivatives may be used to describe circuits, devices, systems, methods, techniques, communication channels, etc., that may communicate data through the use of modulated electromagnetic radiation through a non-solid medium. The term does not imply that the associated devices do not contain any wires, although in some embodiments they might not. Many of the embodiments described herein may be used with WiFi and 3GPP/LTE communication systems. However, communication chips 606 may implement any of a number of wireless standards or protocols, including but not limited to IEEE 702.20, General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Bluetooth, derivatives thereof, as well as any other wireless protocols that are designated as 3G, 4G, 5G, and beyond. Computing device 600 may include a plurality of communication chips 606. For instance, a first communication chip 606 may be dedicated to shorter range wireless communications such as Wi-Fi and Bluetooth and a second communication chip 606 may be dedicated to longer range wireless communications such as GPS, EDGE, GPRS, CDMA, WiMAX, LTE, Ev-DO, and others.

In various implementations, computing device 600 may be a laptop, a netbook, a notebook, an ultrabook™, a smartphone, a computing tablet, a personal digital assistant, an ultra mobile PC, a mobile phone, a desktop computer, a server, a printer, a scanner, a monitor, a set-top box, an entertainment control unit (e.g., a gaming console), a digital camera, a portable music player, or a digital video recorder. In further implementations, computing device 600 may be any other electronic device that processes data.

FIG. 7 illustrates an article of manufacture 710 having programming instructions, incorporating aspects of the present disclosure, in accordance with various embodiments. In various embodiments, an article of manufacture may be employed to implement various embodiments of the present disclosure. As shown, the article of manufacture 710 may include a computer-readable non-transitory storage medium 720 where instructions configured to implement WLAN offloading 730 reside. The storage medium 720 may represent a broad range of persistent storage medium known in the art, including but not limited to flash memory, dynamic random access memory, static random access memory, an optical disk, a magnetic disk, etc. Instructions 730 may enable an apparatus, in response to their execution by the apparatus, to perform various operations described herein. For example, storage medium 720 may include instructions 730 configured to cause an apparatus or system to practice some or all aspects of WLAN offloading of the process 300 of FIG. 3, the process 400 of FIG. 4, and/or the process 500 of FIG. 5, in accordance with embodiments of the present disclosure.

Computer-readable media (including non-transitory computer-readable media and/or tangible computer-readable media), methods, systems and devices for performing the above-described techniques are illustrative examples of embodiments disclosed herein. Additionally, other devices may be configured to perform various disclosed techniques.

Thus, apparatus, methods, and storage medium associated with WLAN offloading have been described. The following paragraphs describe examples of various embodiments.

Example 1 is an apparatus for WLAN offloading, which may include: an access controller to communicate a first management information with a plurality of WLAN APs via a type-1 interface; an IRP agent to communicate a second management information with an IRP manager of a network management apparatus via a type-2 interface; and a translation module, coupled with the AC and the IRP agent, to map the first management information to the second management information or the second management information to the first management information.

Example 2 may include the subject matter of Example 1, and further specifies that the first management information may include WLAN performance monitoring information or WLAN alarm reporting information Example 3 may include the subject matter of Example 1 or 2, and further specifies that the second management information may include WLAN offloading information or WLAN management information.

Example 4 may include the subject matter of any one of Examples 1-3, and further specifies that the type-1 interface is implemented according to a standardized protocol in IEEE 802.11 or a proprietary protocol used by at least one of the plurality of WLAN APs.

Example 5 may include the subject matter of any one of Examples 1-4, and further specifies that the type-2 interface is a standardized interface in 3GPP.

Example 6 may include the subject matter of Example 5, and further specifies that the type-2 interface is a PMIRP interface, and the IRP agent is to communicate a plurality of performance measurements in the second management information to the IRP manager via the PMIRP interface.

Example 7 may include the subject matter of Example 5, and further specifies that the type-2 interface is an AlarmIRP interface and the IRP agent is to communicate a plurality of alarms in the second management information to the IRP manager via the AlarmIRP interface.

Example 8 may include the subject matter of any one of Examples 1-7, and further specifies that the IRP agent is configured to allow the IRP manager to inquire a plurality of performance measurements from the plurality of WLAN APs.

Example 9 is an network management apparatus for WLAN offloading, which may include: a monitor module of a cellular network to monitor multiple indicators of one or more wireless local area network access points, wherein the multiple indicators are provided to the NM apparatus from at least one element manager that is in direct communication with the one or more WLAN APs; a trigger module, coupled to the monitor module, to activate an offloading operation based at least in part on the multiple indicators; and an instruction module, coupled to the trigger module, to instruct one or more base stations and the one or more WLAN APs to adjust offloading traffic between the one or more base stations and the one or more WLAN APs when the offloading operation is triggered.

Example 10 may include the subject matter of Example 9, and further specifies that the multiple indicators may include multiple performance measurements and multiple alarms.

Example 11 may include the subject matter of Example 10, and further specifies that the trigger module may set a traffic volume threshold for WLAN offloading based at least in part on at least one of the multiple performance measurements or at least one of the multiple alarms, and activate the offloading operation based at least in part on the traffic volume threshold.

Example 12 may include the subject matter of Example 10 or 11, and further specifies that the trigger module may set a traffic type filter for WLAN offloading based at least in part on at least one of the multiple performance measurements or at least one of the multiple alarms, and activate the offloading operation based at least in part on the traffic type filter.

Example 13 may include the subject matter of any one of Examples 10-12, and further specifies that the cellular network may be an evolved universal terrestrial radio access network, universal mobile telecommunications system terrestrial radio access network, or a global system for mobile communications enhanced data rates for global system for mobile communication evolved radio access network.

Example 14 may include the subject matter of any one of Examples 10-13, and further specifies that the coverage of at least one of the one or more WLAN APs is overlaid with at least one of the one or more cells to support the offloading operation.

Example 15 is an network management system for wireless local area network offloading, which may include: a network manager; a first element manager, coupled to the network manager, to communicate with the network manager and multiple WLANs; and a second element manager, coupled to the network manager, to communicate with the network manager and multiple base stations of a cellular network. The coverage of at least one access point of the multiple WLANs may be overlaid with the coverage of at least one base station of the cellular network to support a WLAN offloading operation. The network manager may activate the WLAN offloading operation based at least in part on at least one indicator received from the multiple WLANs.

Example 16 may include the subject matter of Example 15, and further specifies that the network manager may include: a monitor module to monitor multiple indicators of the at least one AP of the multiple WLANs; a trigger module, coupled to the monitor module, to activate the offloading operation; and an instruction module, coupled to the trigger module, to instruct the at least one AP of the multiple WLANs and the at least one of the multiple cells to adjust offloading traffic between the at least one AP of the multiple WLANs and the at least one base station of the cellular network when the offloading operation is triggered.

Example 17 may include the subject matter of Example 16, and further specifies that the multiple indicators may include multiple performance measurements and multiple alarms.

Example 18 may include the subject matter of Example 17, and further specifies that the offloading operation may include setting a traffic volume threshold or setting a traffic type filter for WLAN offloading based at least in part on the multiple performance measurements or the multiple alarms.

Example 19 may include the subject matter of Example 15, and further specifies that the first element manager may include: an access controller to communicate a first management information with the at least one AP of the multiple WLANs via a type-1 interface; an IRP agent to communicate a second management information with the monitor module of the network manager via a type-2 interface; and a translation module, coupled with the AC and the IRP agent, to map the first management information to the second management information or the second management information to the first management information.

Example 20 may include the subject matter of Example 19, and further specifies that the first management information may include WLAN performance monitoring information or WLAN alarm reporting information.

Example 21 may include the subject matter of Example 19, and further specifies that the second management information may include WLAN offloading or management information.

Example 22 may include the subject matter of Example 19, and further specifies that the type-1 interface is implemented according to a standardized protocol in IEEE 802.11 or a proprietary protocol used by the at least one AP.

Example 23 may include the subject matter of Example 19, and further specifies that the type-2 interface is a standardized interface in 3GPP.

Example 24 may include the subject matter of Example 23, and further specifies that the type-2 interface is a PMIRP interface, and the IRP agent is to communicate multiple performance measurements in the second management information to the IRP manager via the PMIRP interface.

Example 25 may include the subject matter of Example 23, and further specifies that the type-2 interface is an AlarmIRP interface and the IRP agent is to communicate multiple alarms in the second management information to the IRP manager via the AlarmIRP interface.

Example 26 may include the subject matter of any one of Examples 15-25, and further specifies at least one of the one or more base stations belongs to a selected one of an evolved universal terrestrial radio access network, universal mobile telecommunications system terrestrial radio access network, or a global system for mobile communications enhanced data rates for global system for mobile communication evolved radio access network.

Example 27 is a method for wireless local area network offloading which may include: receiving, by an element manager, a first management information from an access point of a WLAN via a type-1 interface; mapping, by the element manager, the first management information to a second management information; and sending, by the element manager, the second management information to a network manager via a type-2 interface. The second management information may cause a WLAN offloading operation.

Example 28 may include the subject matter of Example 27, and further include: instructing the AP via the type-1 interface, by the element manager, to adjust offloading traffic between the AP and a base station of a cellular network based at least in part on the WLAN offloading operation.

Example 29 may include the subject matter of Example 27, and further specifies that the first management information may include at least one of multiple performance measurements of the AP or at least one of multiple alarms from the AP.

Example 30 may include the subject matter of Example 27, and further specifies that the type-1 interface may be implemented according to a standardized protocol in IEEE 802.11 or a proprietary protocol used by the AP.

Example 31 may include the subject matter of Example 27, and further specifies that the type-2 interface may be a standardized interface in 3GPP.

Example 32 may include the subject matter of Example 27, and further specifies that the WLAN offloading operation is based at least in part on a traffic volume threshold or a traffic type filter for WLAN offloading.

Example 33 is an apparatus for wireless local area network offloading which may include: means to receive first management information from an access point of a WLAN via a type-1 interface; means to map the first management information to second management information; and means to send the second management information to a network manager via a type-2 interface. The second management information may cause a WLAN offloading operation.

Example 34 may include the subject matter of Example 33, and further include means to instruct the AP via the type-1 interface to adjust offloading traffic between the AP and a base station of the cellular network based at least in part on the WLAN offloading operation.

Example 35 may include the subject matter of Example 33, and further specifies that the first management information may include at least one of multiple performance measurements of the AP or at least one of multiple alarms from the AP.

Example 36 may include the subject matter of Example 33, and further specifies that the type-1 interface may be implemented according to a standardized protocol in IEEE 802.11 or a proprietary protocol used by the AP.

Example 37 may include the subject matter of Example 33, and further specifies that the type-2 interface may be a standardized interface in 3GPP.

Example 38 is one or more non-transitory computer-readable media having instructions that, when executed, cause a network management apparatus to: receive a message from an AP of a WLAN via a type-2 interface; and trigger a WLAN offloading operation based at least in part on the message. The message may be sent by the AP via a type-1 interface.

Example 39 may include the subject matter of Example 38, and further cause an element management apparatus to translate the message between the type-1 interface and the type-2 interface wherein the type-1 interface is implemented according to a standardized protocol in IEEE 802.11 or a proprietary protocol used by the AP, and the type-2 interface is a standardized interface in 3GPP.

Example 40 may include the subject matter of Example 38, and further cause the network management apparatus to set a traffic volume threshold or a traffic type filter for WLAN offloading based at least in part on the message.

Example 41 may include the subject matter of Example 40, and further cause the network management apparatus to instruct one or more APs and one or more base stations to adjust offloading traffic between the one or more APs and the one or more base stations based at least in part on the traffic volume threshold or the traffic type filter.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. One or more non-transitory, computer-readable media having instructions that, when executed, cause an element manager ("EM") to:
   obtain first management information transmitted from an access point ("AP") of a wireless local area access network ("WLAN") via a first interface, wherein the first management information includes WLAN performance information or WLAN alarm information; and
   map the first management information to second management information to be sent via a Type-2 interface, wherein the Type-2 interface is implemented according to a 3rd generation partnership project ("3GPP") protocol, and wherein the Type-2 interface and the first interface are different,
   wherein the instructions, when executed, further cause the EM to send the second management information to an integration reference point ("IRP") manager of a 3GPP communication network via the Type-2 interface to facilitate management of a WLAN offloading operation based on the WLAN performance information or the WLAN alarm information,
   wherein the first management information is to indicate a state change of the AP.

2. The one or more non-transitory, computer-readable media of claim 1, wherein the state change is a change of an ifOperStatus object to up, to indicate a WLAN air interface link is up, or down, to indicate the WLAN air interface link is down.

3. The one or more non-transitory, computer-readable media of claim 1, wherein the second management information includes WLAN alarm information and the Type-2 interface is an alarm integration reference point (AlarmIRP) interface.

4. The one or more non-transitory, computer-readable media of claim 1, wherein the EM is to receive the first management information from an access controller.

5. The one or more non-transitory, computer-readable media of claim 1, wherein the first interface is a Type-1 interface implemented according to a standardized protocol in Institute of Electrical and Electronics Engineers ("IEEE") 802.11.

6. The one or more non-transitory, computer-readable media of claim 1, wherein the first management information includes one or more counters to provide a request to send failure count, an acknowledgment failure count, or a media access control protocol data units received count.

7. An element manager ("EM") comprising:
   translator circuitry to:
      obtain first management information transmitted from an access point ("AP") of a wireless local area access network ("WLAN") via a first interface, wherein the first management information includes WLAN alarm information; and
      map the first management information to second management information to be sent via an alarm integration reference point ("AlarmIRP") interface, wherein the AlarmIRP interface is implemented according to a 3rd generation partnership project ("3GPP") protocol; and
   integration reference point ("IRP") agent circuitry coupled with the translator circuitry to send the second management information to an IRP manager of a 3GPP communication network via the AlarmIRP interface to facilitate management of a WLAN offloading operation based on the WLAN alarm information,
   wherein the first management information is to indicate a state change of the AP.

8. The EM of claim 7, wherein the state change is a change of an ifOperStatus object to up, to indicate a WLAN air interface link is up, or down, to indicate the WLAN air interface link is down.

9. The EM of claim 7, wherein the translator circuitry is to receive the first management information from an access controller.

10. The EM of claim 7, wherein the first interface is a Type-1 interface implemented according to a standardized protocol in Institute of Electrical and Electronics Engineers ("IEEE") 802.11.

11. The EM of claim 7, wherein the first management information comprises a plurality of alarms from the AP.

12. A system comprising:
access controller ("AC") circuitry to communicate first management information with a plurality of wireless local area access network ("WLAN") access points ("APs") via a Type-1 interface, wherein the first management information includes WLAN performance information or WLAN alarm information, and wherein the Type-1 interface is implemented according to a lightweight access point protocol ("LWAPP") used by at least one of the plurality of WLAN APs;
integration reference point ("IRP") agent circuitry to communicate second management information with an IRP manager of a network management (NM) apparatus via a Type-2 interface to facilitate management of a WLAN offloading operation based on the WLAN performance information of the WLAN alarm information, wherein the Type-2 interface is implemented according to a standardized protocol in 3rd generation partnership project ("3GPP"), and wherein the type-2 interface and the type-1 interface are different; and
translation circuitry, coupled with the AC circuitry and the IRP agent circuitry, to map the first management information to the second management information or the second management information to the first management information,
wherein the first management information is to indicate a state change of a first AP of the plurality of WLAN APs.

13. The system of claim 12, wherein the first management information includes WLAN performance monitoring information.

14. The system of claim 12, wherein the second management information comprises WLAN offloading information or WLAN management information.

15. The system of claim 12, wherein the Type-2 interface is a performance management integration reference point ("PMIRP") interface, and the IRP agent circuitry is to communicate a plurality of performance measurements in the second management information to the IRP manager via the PMIRP interface.

16. The system of claim 12, wherein the Type-2 interface is an alarm integration reference point ("AlarmIRP") interface and the IRP agent circuitry is to communicate a plurality of alarms in the second management information to the IRP manager via the AlarmIRP interface, the plurality of alarms received from the plurality of WLAN APs via the Type-1 interface.

17. The system of claim 12, wherein the IRP agent circuitry is to provide, to the IRP manager, a plurality of performance measurements from the plurality of WLAN APs.

18. The system of claim 12, wherein the AC circuitry is to receive performance measurements of the WLAN APs in a form that is compatible with the LWAPP.

19. The system of claim 18, wherein the performance measurements are received in a form that is compatible with a quality of service ("QoS") counters table, and wherein the translation circuitry is to translate the performance measurements of the WLAN APs from the QoS counters table to the Type-2 interface.

20. The system of claim 18, wherein the performance measurements comprise data volume measured per elapsed time on a media access control ("MAC") layer or an Internet protocol ("IP") layer of the WLAN APs.

21. One or more non-transitory, computer-readable media having instructions that, when executed, cause an element manager to:
obtain first management information from an access point ("AP") of a wireless local area access network ("WLAN") via a Type-1 interface, wherein the first management information includes WLAN performance information or WLAN alarm information, and wherein the Type-1 interface is implemented according to a lightweight access point protocol ("LWAPP");
map the first management information to second management information to be sent via a Type-2 interface, wherein the Type-2 interface is implemented according to a standardized protocol in 3rd generation partnership project (3GPP), and wherein the Type-2 interface and the Type-1 interface are different; and
send the second management information to a network manager associated with a 3GPP communication network via the Type-2 interface; and
send instructions to the AP via the Type-1 interface to adjust offloading traffic between the AP and a base station of a cellular network,
wherein the first management information is to indicate a state change in the AP.

22. The one or more non-transitory, computer-readable media of claim 21, wherein the element manager is to send the instructions based on a traffic volume threshold or a traffic type filter for WLAN offloading.

23. The one or more non-transitory, computer-readable media of claim 21, wherein the first management information comprises a plurality of performance measurements of the AP or a plurality of alarms from the AP.

24. The one or more non-transitory, computer-readable media of claim 21, wherein the first management information comprises performance measurements of the AP in a form that is compatible with a control and provisioning of wireless access points ("CAPWAP") protocol.

25. The one or more non-transitory, computer-readable media of claim 24, wherein the performance measurements are received in a form that is compatible with a quality of service ("QoS") counters table, and wherein translate the first management information comprises translate the performance measurements of the AP from the QoS counters table to the Type-2 interface.

26. The one or more non-transitory, computer-readable media of claim 24, wherein the performance measurements comprise data volume measured on a media access control ("MAC") layer of the AP.

27. The one or more non-transitory, computer-readable media of claim 24, wherein the performance measurements comprise data volume measured on an IP layer of the AP per elapsed time.

28. The one or more non-transitory, computer-readable media of claim 21, wherein the instructions, when executed, further cause the element manager to:
detect one or more AP faults associated with the WLAN based on the first management information; and
reduce an offloading volume threshold associated with the WLAN offloading operation based on detection of one or more AP faults.

29. The one or more non-transitory, computer-readable media of claim 21, wherein the instructions, when executed, further cause the element manager to:
monitor a distribution of traffic among two or more cells of the AP based on the first management information; and redistribute a part of the traffic from a first AP cell to a second AP cell based on an imbalance in the distribution of traffic.

\* \* \* \* \*